FANS

Original Filed March 1, 1955 4 Sheets-Sheet 1

INVENTOR.
Bruno Eck
BY
Michael S. Striker
Atty.

FANS

Original Filed March 1, 1955 4 Sheets-Sheet 2

INVENTOR.
Bruno Eck
BY
Michael S. Striker
Agt

FANS

Original Filed March 1, 1955 4 Sheets-Sheet 3

INVENTOR.
Bruno Eck
BY
Michael S. Striker
Agt.

INVENTOR.
Bruno Eck
BY
Michael S. Striker
Agt.

United States Patent Office

Re. 25,365
Reissued Apr. 2, 1963

25,365
FANS

Bruno Eck, Koln-Klettenberg, Germany

Original No. 2,942,773, dated June 28, 1960, Ser. No. 493,432, Mar. 1, 1955. Application for reissue June 29, 1961, Ser. No. 120,791. In Germany July 17, 1953
Public Law 619, Aug. 23, 1954
Patent expires July 17, 1973
17 Claims. (Cl. 230—125)

Matter enclosed in heavy brackets [ ] appears in the original patent but forms no part of this reissue specification; matter printed in italics indicates the additions made by reissue.

The present invention relates to fans.

In general there are two classical types of well known fans, namely, the axial flow type of fan and the radial flow type of fan. Both of these known types of fans have disadvantages. Thus, these known fans invariably make a great amount of noise during their operation and considerable problems are involved in locating such fans in small spaces. Furthermore, it is difficult without replacing one of these known fans to provide great variations in the output.

One of the objects of the present invention is to overcome the above drawbacks by providing a fan which will operate with far less noise than the above-discussed conventional fans, will provide a higher output than the known fans for a given size and speed of rotation of the fans, and will be capable of providing a wide range in output simply by changing the speed of rotation of the fan.

Another object of the present invention is to provide a fan which, except for the motor which drives the same, may be entirely located within a duct so that a minimum of space is required for the fan of the invention.

A further object of the present invention is to provide an arrangement according to which almost any desired number of fans may be connected to the same source of energy to be driven thereby.

An additional object of the present invention is to provide a fan construction which may be very easily adapted to any given conditions.

Also, the objects of the present invention includes the provision of a fan which may be constructed of well known materials and with the same tools as are used for the construction of conventional fans.

With the above objects in view the present invention mainly consists of a fan which includes a plurality of elongated impeller blades of substantially the same length uniformly distributed about a cylindrical space and respectively having inner side edges located along a first cylinder and outer side edges located along a second cylinder coaxial with and greater than the first cylinder, these blades being substantially parallel to the common axis of the cylinders. A casing means supports the impeller means for rotation about this common axis, and this casing means is formed with an inlet communicating at any given instant with a first plurality of blades located on one side of the above-mentioned axis and with an outlet communicating at any given instant with a second plurality of blades located at an opposite side of this axis, the casing means also including a first arcuate wall portion extending from the inlet to the outlet and located closely adjacent to and conforming to the curvature of the above-mentioned second cylinder and a second arcuate wall portion opposite this first wall portion, also extending from the inlet to the outlet of the casing means, and having end portions respectively located adjacent the inlet and outlet with the end portion adjacent the inlet located nearer to the above-mentioned axis than the end portion adjacent the outlet, so that this second wall portion of the casing forms with the above-mentioned second cylinder a gap which converges *along a portion of its length* from said [inlet] *outlet* toward said [outlet] *inlet*.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Before proceeding to a detailed discussion of the drawings shown in this application, it is pointed out that the fan of the present invention differs basically from known fans in that it cannot be classified either as a radial flow fan or as an axial flow fan. According to the present invention air is sucked into the fan of the invention through the spaces between some of the impeller blades of the fan and this air (or other fluid) passes across the interior of the fan and moves out through the spaces between some of the impeller blades, at a particular instant. Thus, with the fan of the present invention the fluid flows twice through the blades of the impeller.

Figure 1:
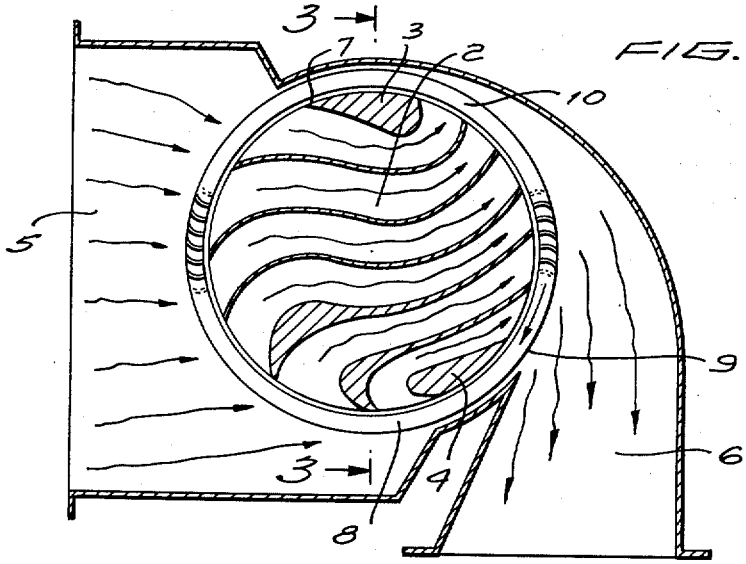
FIG. 1 is a sectional side elevational view of a fan constructed in accordance with the present invention.
Figure 3:
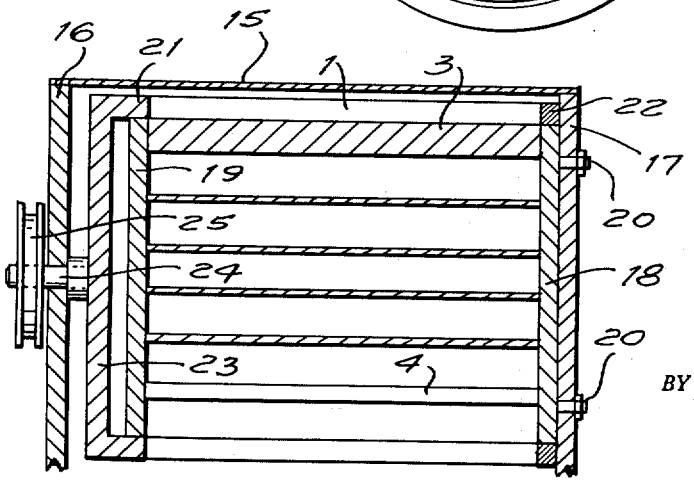
FIG. 3 is a fragmentary sectional view taken along the line 3—3 of FIG. 1 in the direction of the arrows.

Referring now to the drawings, FIG. 1 shows an impeller 1 provided with impeller blades distributed along a cylinder, as is evident from FIG. 1, the impeller 1 turning in a clockwise direction, as viewed in FIG. 1, and as indicated by the arrow of FIG. 1. The impeller blades of the impeller 1 are located about a cylindrical space 2 within which guides 3 and 4 for the air are located. The impeller is supported for rotation by a casing which is formed with an inlet 5 and an outlet 6, and it will be noted that the inlet angle extending from point 7 to point 8 indicated in FIG. 1 is greater than the outlet angle extending from point 9 to point 10 indicated in FIG. 1. FIG. 3 shows the manner in which the impeller and guides 3 and 4 are mounted on the casing 15. Thus, this casing 15 includes side walls 16 and 17, and the guides 3 and 4, as well as the several guides shown in FIG. 1 between the guides 3 and 4, extend between and are fixed to a pair of end plates 18 and 19. The end plate 18 is fixed to a pair of studs 20 which extend to and are fixed to the side wall 17, and the end plate 19 is located within the impeller 1. This impeller 1 is coaxial with the cylinder in which the guides are located, and the blades of the impeller are carried by a pair of rings 21 and 22 which are slidable on the peripheries of the end plates 19 and 18, respectively, so that these end plates form bearings for the impeller. The ring 21 is in the form of an annular flange integral with a plate 23 fixed to a shaft 24 which extends through side wall 16 of the casing 15 and which is turnably supported by the side wall, a pulley 25 or the like being fixed to the shaft 24 so that in this way impeller 1 may be driven.

In operation, as the impeller 1 turns in a clockwise direction, as viewed in FIG. 1, the blades of the impeller suck air in through the inlet 5, force this air along the space 2 where the guides for the air are located, and the air is forced again through the impeller blades out through the outlet 6. It will be noted that the angle of the inlet 5 about the axis of rotation of the impeller is greater than that of the oulet 6.

Figure 2:
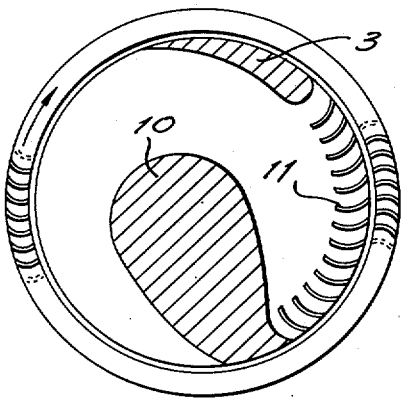
FIG. 2 is a fragmentary view corresponding to FIG. 1 of part of the fan of FIG. 1 with a different structure located within the fan.

FIG. 2 shows a fan identical with that of FIG. 1 except that the interior of the space surrounded by the impeller is provided, in addition to the guide 3, with a single guide 10 and a plurality of stationary vanes 11, as indicated in FIG. 2, the guides of FIG. 2 operating in the same way as the guides of FIG. 1 to direct the air across the space surrounded by the impeller.

Figure 4:
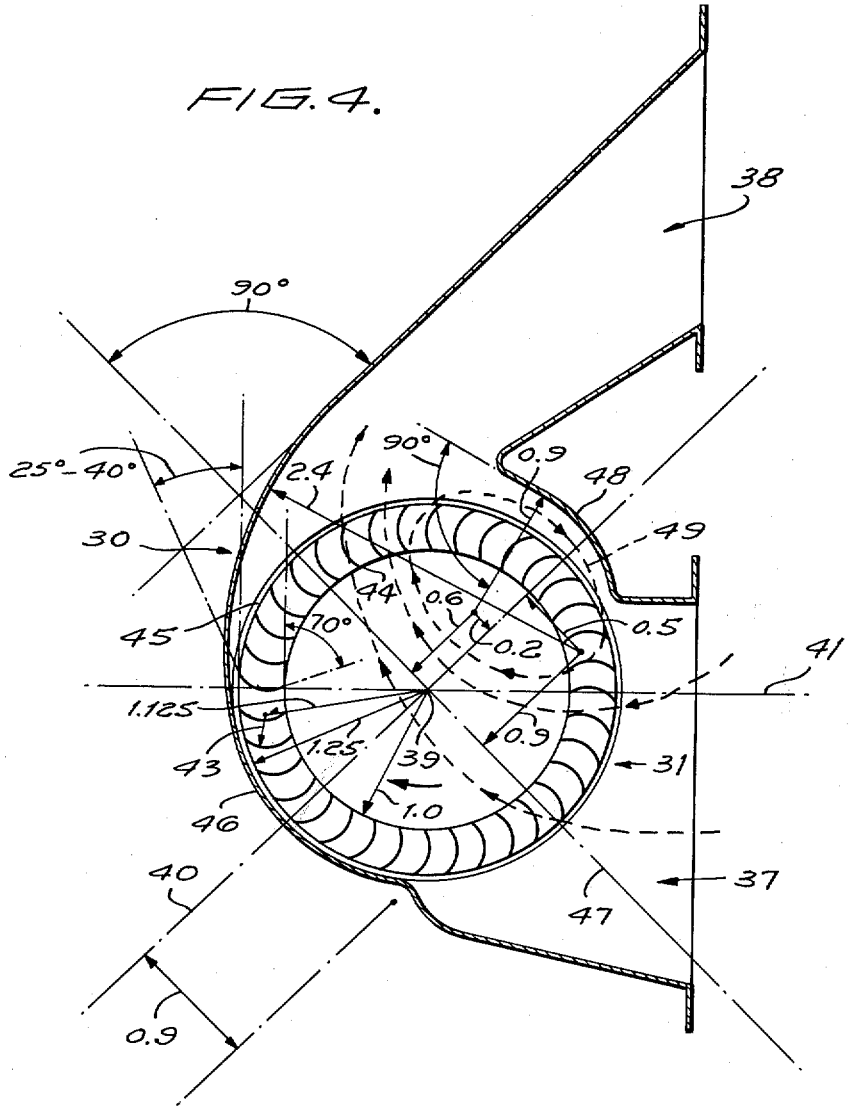
FIG. 4 is a side sectional view taken along the line 4—4 of FIG. 5 in the direction of the arrows of another fan constructed in accordance with the present invention, FIG. 4 showing the dimensional relationships between the parts of the fan of the present invention.
Figure 5:
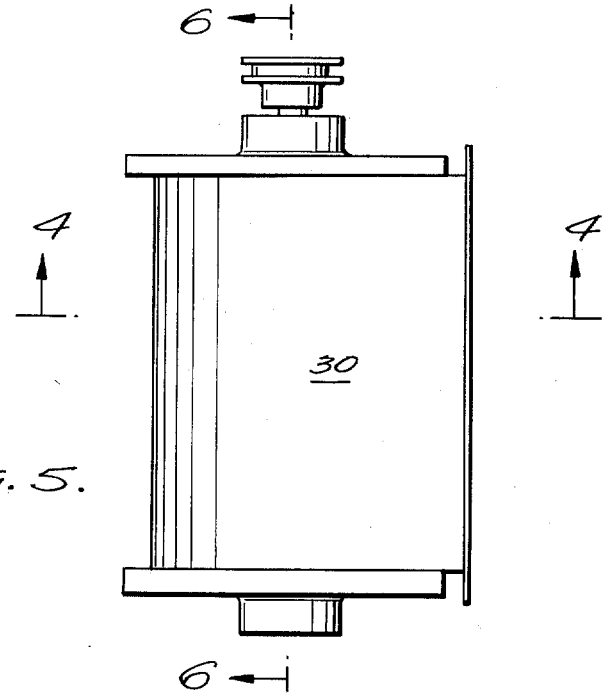
FIG. 5 is a plan view of the fan of FIG. 4.
Figure 6:
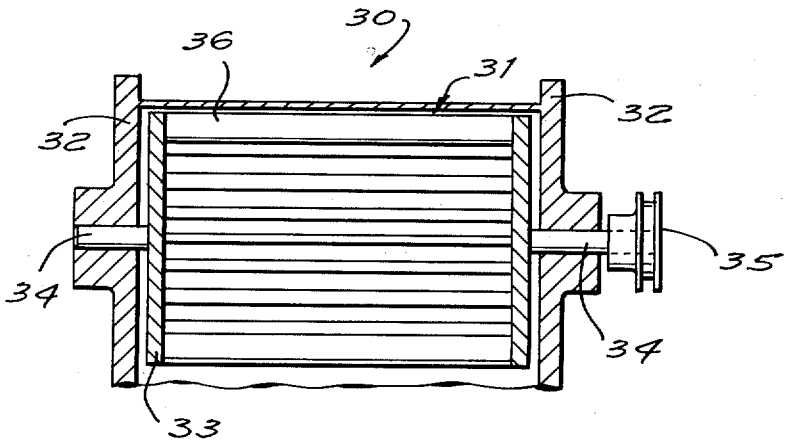
FIG. 6 is a sectional view taken along the line 6—6 of FIG. 5 in the direction of the arrows.

FIGS. 4–6 show a preferred construction of a fan in accordance with the present invention. Thus, referring to FIGS. 4–6 it will be seen that the fan disclosed therein includes a casing 30 in which the impeller 31 is supported for rotation. As may be seen from FIG. 6, the impeller 31 is carried for rotation by the side walls 32 of the casing 30. The impeller includes a pair of circular, coaxial, end plates 33 each of which is fixed to a shaft 34 extending outwardly through an opening in a side wall 32 to be turnably supported by the casing 30. The right shaft 34 of FIG. 6 is fixed to a pulley 35 so that with a belt a drive may be transmitted from any suitable motor or the like to the impeller. The blades 36 are located between and fixed to the end plates 33, and it will be noted that with the fan of FIGS. 4–6 there is absolutely nothing in the space surrounded by the impeller. It will be noted from FIGS. 5 and 6 that the impeller is quite long, and in fact it is possible to make the impeller blades of any desired length without in any way altering the operation of the fan of the invention.

As may be seen from FIG. 4, the casing 30 is provided with an inlet 37 which converges as it approaches the impeller 31 and with an outlet 38 which diverges as it leaves the impeller 31. Furthermore, it will be noted that, as was the case with the embodiment of FIG. 1, the angle through which the inlet 37 extends about the axis 39 of the impeller is larger than the angle through which the outlet 38 extends about this axis. The inlet and outlet ducts each communicates with the rotor at the periphery thereof over an angle of at least 90°, as is evident from FIG. 4.

It has been found empirically that in order to produce the best possible results it is necessary for the elements of the fan of the inventioin to have certain relationships with respect to each other, and such relationships are indicated in FIG. 4. FIG. 4 shows a fan where the outlet 38 extends in general along a direction, taken at random, parallel to the plane 40 passing through the axis of the impeller, and the inlet 37 extends in a direction parallel to the horizontal plane 41 shown in FIG. 4. In order to show the relationship between the several elements of the fan of the invention, it is assumed that the cylinder along which the inner side edges of the blades 42 of the impeller are located has a radius of 1. With such a radius of 1 for this inner cylinder, the outer cylinder along which the outer side edges of the blade 42 are located, will have a radius of approximately 1.25. Furthermore, each of the blades 42 itself forms part of a cylinder. It is preferred to provide 36 blades on the impeller so that the blades are spaced from each other by 10°, and the cylinder of which each blade forms a part has a radius 43 which is approximately as long as the distance between each pair of adjacent blades, the center of radius 43 being located between the inner and outer cylinders 44 and 45 in which the inner side edges and outer side edges of the blade 42 are respectively located. The center of the radius 43 may be located midway between cylinders 44 and 45 at a distance of 1.125 from the axis 39.

The inner edge of each blade 42 is curved in the direction of rotation of the impeller.

On the other hand, the outer side edge of each blade 42 may make an angle of between 25 and 40° with a tangent to the cylinder 45, as shown in FIG. 4. Thus, it has been found by test that the particular angle made by the outer side edge of each blade with the outer cylinder 45 is not particularly critical as long as it is somewhere between 25 and 40°. Thus, actual fans constructed in accordance with the present invention and operating very successfully have had angles at the outer side edges of the blades, respectively with the cylinder 45 of 26° and also of 38°. However, the angle of the inner side edge of each blade with a tangent to the cylinder 44 is always 70° or very close thereto.

The casing 30 includes a wall portion 46 extending from the inlet to the outlet and an opposite wall portion 48 extending from the inlet to the outlet. As is evident from FIG. 4, the wall portion 46 is located closely adjacent to and corresponds closely to the curvature of the cylinder 45. It has been found best to terminate the wall portion 46 at its inlet end at a distance of 0.9 from the plane 40, as indicated in FIG. 4, and the wall portion 46 merges beyond this point with the part of the casing 30 which forms the inlet 37. The opposite end of the wall portion 46 is preferably formed along a curve having a radius of approximately 2.4, the center of this radius being located at a distance of approximately 0.9 from plane 47 which is normal to the plane 40 and at a distance of 0.5 from the plane 40, as shown in FIG. 4. Furthermore, it will be noted that the top wall of the outlet 38, as viewed in FIG. 4, is located in a plane which is perpendicular to the axis 47.

A particular feature of the invention resides in the configuration of the wall 48 of the casing 30. This wall 48 has a radius of curvature slightly less than 1, such as, for example, 0.9. Furthermore, this radius has its center spaced by 0.2 from plane 40 and 0.6 from plane 47, as shown in FIG. 4. It will be noted that wall portion 48 thus has its end portion next to the inlet 37 located nearer to the axis 39 than its end portion next to the outlet 38, and as a result the wall portion 48 forms with a cylinder 45 a gap which converges as it approaches the inlet 37. At the point where the wall portion 48 is located furthest from the axis 39 it extends toward the outlet 38 along a tangent to this point so that this tangential part of wall portion 48 makes an angle of 90° with the radius of curvature of wall portion 48 at this point furthest from the axle 39.

As a result of this latter feature of the invention, the impeller 31 when driven in a clockwise direction, as viewed in FIG. 4, creates a whirling body of air 49 indicated in dot-dash lines in FIG. 4. This whirling body of air acts in the same way as a solid guide of the type shown in FIGS. 1 and 2 so that it is possible to eliminate such solid guides with the construction shown in FIG. 4. The whirling body of air 49 which moves continuously in a clockwise direction, as the impeller itself rotates in a clockwise direction, does not in any way interfere with the air passing through the fan and serves to guide this air in the same way as the solid guide would.

It is pointed out that no units are given for the above discussed relationships since the particular size of the fan is a matter of choice. In other words, the radius of the inner cylinder 44 may be 1′, or 6″, or 2′, or any other desired dimension depending upon the conditions to be met by the fan. It is only important that the several parts of the fan have the relationships indicated in FIG. 4 and described above, and even here all of these relationships are approximate. Furthermore, the radius of curvature of the wall portion 48 should be equal to the distance between the plane 47 and the center of the radius of curvature of the end portion of wall 30 next to the outlet 38.

Figure 7:
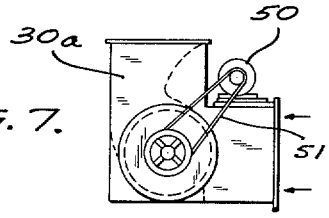
FIG. 7 is a schematic side view of another form of fan constructed in accordance with the present invention.
Figure 8:
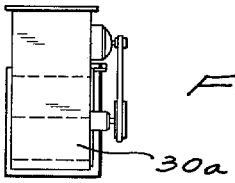
FIG. 8 is an end view of the fan of FIG. 7 as seen from the left side of FIG. 7.
Figure 9:
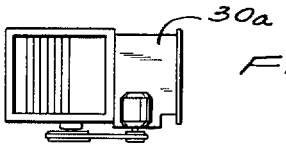
FIG. 9 is a top plan view of the fan of FIG. 7.

The structure of the present invention may take many different forms. Thus, FIGS. 7–9 are respectively side, end, and top plan views of a fan constructed in accordance with the present invention and having its housing 30a shaped so as to direct air after passing through the fan in a direction which makes an angle of 90° with the air entering the fan. FIGS. 7–9 further show diagrammatically the motor 15 which drives the impeller through the belt 51. Any suitable means may be provided to adjust the tension of the belt 51. As is indicated in dotted lines in FIG. 7, the walls of the casing 30 which are next to the impeller conform to the above requirements.

Figure 10:
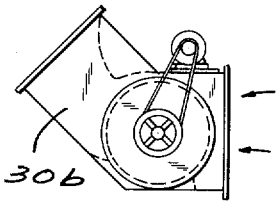
FIG. 10 is a schematic side view of still another form of fan constructed in accordance with the present invention.
Figure 11:
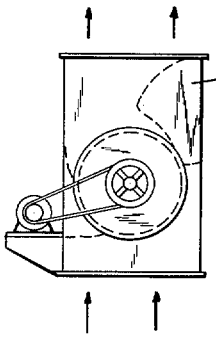
FIG. 11 is a schematic side elevational view of a further form of a fan constructed in accordance with the present invention.
Figure 12:
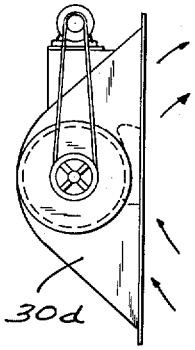
FIG. 12 shows in a schematic side elevational view a still further embodiment of the present invention.

FIG. 10 shows an arrangement where the casing 30b is shaped so as to direct the air issuing from the fan at an angle of 45° with the air entering the fan. FIG. 11 shows an arrangement where the casing 30c is shaped to direct the air leaving the fan in a direction which makes an angle of 0° with the air entering the fan, and FIG. 12 shows an arrangement similar to that of FIGS. 7–9 in that the air is deflected through 90° by the casing 30d after passing through the fan. However, it will be noted that the air enters and leaves the casing 30d at an angle of 45° with respect to a horizontal plane.

As is shown in the dotted lines of FIGS. 10–12, the walls of the casings 30b, 30c, and 30d, where they are located next to the impeller conform closely to the requirements discussed above in connection with FIG. 4.

It has been found that with the fan of the invention, which may be called a cross flow fan, produces far less noise at a given speed of rotation than either a radial or axial flow conventional fan operating at the same speed of rotation. Furthermore, it will be noted that the fan of the invention may have its impeller located directly within a duct, so that very little space is required for the fan of the invention. The impeller may be made of any desired length, since the length of the impeller in no way influences the operation of the fan of the invention. In order to vary the output of the fan of the invention, it is only necessary to change the speed of rotation of the impeller accordingly. Furthermore, with the fan of the invention there are no operating characteristics which change suddenly at two speeds of operation which are close to each other. In other words, when increasing or decreasing the speed of rotation of the fan of the invention there is no danger of passing through certain critical speeds as is the case with known fans.

While the invention has been illustrated and described as embodied in cross flow fans, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A fan comprising, in combination, impeller means having a predetermined direction of rotation including a plurality of elongated impeller blades of substantially the same length uniformly distributed about a cylindrical space and respectively having inner side edges located along a first cylinder and outer side edges located along a second cylinder coaxial with and greater than said first cylinder, said blades being substantially parallel to the common axis of said cylinders, and a casing supporting said impeller means for rotation about said axis, said casing having an inlet communicating at any given instant with a first plurality of blades located on one side of said axis and with an outlet communicating at any given instant with a second plurality of blades located at an opposite side of said axis, and said casing including a first arcuate wall portion extending from said inlet to said outlet in the predetermined direction of rotation of the impeller and located closely adjacent to and conforming to the curvature of said second cylinder, and a second arcuate wall portion opposite said first wall portion also extending from said inlet to said outlet in a direction opposite to that of said predetermined direction of rotation of the impeller and spaced throughout its length from the curvature of the second cylinder by a distance substantially greater than the distance between the first wall portion and the second cylinder, and having end portions respectively located adjacent said inlet and outlet with said end portion adjacent said inlet located nearer to said axis than said end portion adjacent said outlet, so that said second wall portion forms with said second cylinder a gap which converges from said outlet toward said inlet in the predetermined direction of rotation of said impeller, whereby a part of the fluid flowing from the inlet to the outlet is reversed and flows backward into said gap and then through the blades into the interior of the cylindrical space.

2. In a fan as claimed in claim 1, each of said blades having, when located adjacent said gap, a concave face directed toward said inlet.

3. In a fan as claimed in claim 1, each of said blades having, when located adjacent said gap, a concave face directed toward said inlet and a convex face directed toward said outlet.

4. In a fan as claimed in claim 1, said inlet and outlet each having a rectangular cross section, each extending about said axis through an angle of more than 90°, and the angle through which said inlet extends about said axis being greater than that through which said outlet extends about said axis.

5. In a fan as claimed in claim 1, the outer portion of each blade making with a tangent to said second cylinder an angle of between 25° and 45°.

6. In a fan as claimed in claim 1, said second cylinder having a radius approximately 1.25 times that of said first cylinder.

7. In a fan as claimed in claim 1, each blade itself forming a part of a cylinder.

8. In a fan as claimed in claim 1, each blade itself forming a part of a cylinder having an axis located between said first and second cylinders and adjacent the next blade.

9. In a fan as claimed in claim 1, said second wall portion having a radius of curvature slightly less than the radius of said first cylinder.

10. In a fan as claimed in claim 1, each blade itself forming part of a cylinder having an axis located between said first and second cylinders and adjacent the next blade, said blades each making with a tangent to said second cylinder an angle of between 25° and 40°, and said second cylinder having a radius approximately 1.25 times that of said first cylinder, said inlet and outlet each having a rectangular cross section, each extending about said axis through an angle of more than 90°, and the angle through which said inlet extends about said axis being greater than that through which said outlet extends about said axis, said second wall portion having a radius of curvature slightly smaller than the radius of said first cylinder, and each of said blades having, when it is located adjacent said gap, a concave face directed toward said inlet and a convex face directed toward said outlet.

11. In a fan as claimed in claim 1, said inlet and outlet making an angle of 45° with respect to each other.

12. In a fan as claimed in claim 1, said second arcuate wall portion being cylindrical and having its axis eccentric to the axis of said cylinders.

13. In a fan as claimed in claim 12, said arcuate wall portion axis being located downstreamward with respect to the axis of said cylinders.

14. In a fan as claimed in claim 13, the radius of curvature of said arcuate portion being less than the distance from the said arcuate portion to the axis of said cylinders.

*15. A fan comprising, in combination, impeller means having a predetermined direction of rotation including a plurality of elongated impeller blades of substantially the same length uniformly distributed about a cylindrical space and respectively having inner side edges located along a first cylinder and outer side edges located along a second cylinder coaxial with and greater than said first cylinder, said blades being substantially parallel to the common axis of said cylinders, and a casing supporting said impeller means for rotation about said axis, said casing having an inlet communicating at any given instant with a first plurality of blades located on one side of said axis and with an outlet communicating at any given instant with a second plurality of blades located at an opposite side of said axis, and said casing including a first arcuate wall portion extending from said inlet to said outlet in the predetermined direction of rotation of the impeller and located adjacent to said second cylinder, and a second arcuate wall portion opposite said first wall portion also extending from said inlet to said outlet in a direction opposite to that of said predetermined direction of rotation of the impeller and spaced throughout its length from the curvature of the second cylinder and having end portions respectively located adjacent said inlet and outlet so that said second wall portion forms with said second cylinder a gap which converges from said outlet towards said inlet in the predetermined direction of rotation of said impeller whereby a part of the fluid flowing from said inlet to the outlet is reversed and flows backward into said gap and then through the blades into the interior of the cylindrical space.*

*16. A fan of the type comprising a hollow rotor having a plurality of elongated impeller blades, a casing surrounding said rotor and forming for said rotor an inlet and outlet, and rotation means for rotating said rotor; said casing including a first wall portion adjacent to said rotor at said inlet and diverging therefrom to said outlet in the direction of rotation of said rotor and a second wall portion spaced from said rotor extending from said outlet to said inlet in the direction of rotation of said rotor with the space between said second wall portion and said rotor forming an unrestricted flow passage gap having at its opening adjacent said outlet a greater cross-sectional area taken in a radial plane to said rotor than the cross-sectional area of its opening adjacent said inlet taken in a radial plane to said rotor and wherein said gap converges along its length extending from said outlet to said inlet; said rotor when rotated forming a fluid vortex wherein the core of the vortex extends partially into said gap and into said rotor and the center of the core of the vortex is positioned inwardly of the outer periphery of the rotating blades so that the vortex guides the flow of fluid from said inlet to said outlet.*

*17. A fan of the type comprising a hollow rotor having a plurality of elongated impeller blades, a casing surrounding said rotor and forming for said rotor an inlet and an outlet, and rotation means for rotating said rotor; said casing including a first wall portion spaced from said rotor extending from said inlet to said outlet in the direction of rotation of said rotor, a second wall portion spaced from said rotor extending from said outlet to said inlet in the direction of rotation of said rotor, and a vortex forming means comprising an unrestricted flow passage gap formed by the spaced between said second wall portion and said rotor which converges from said outlet to said inlet whereby a whirling body of fluid is formed when said rotor is rotated and whereby a part of the fluid flowing from the inlet to the outlet flows into said gap from the outlet and then through the path of the rotating blades into the interior of the rotor.*

References Cited in the file of this patent or the original patent

UNITED STATES PATENTS

| | | |
|---|---|---|
| 507,445 | Mortier | Oct. 24, 1893 |
| 823,526 | Hackenberg | June 19, 1906 |
| 1,075,120 | Rogers | Oct. 7, 1913 |
| 1,823,579 | Anderson | Sept. 15, 1931 |
| 1,838,169 | Anderson | Dec. 29, 1931 |
| 1,886,513 | Anderson | Nov. 8, 1932 |
| 1,920,952 | Anderson | Aug. 8, 1933 |
| 2,217,211 | Brady | Oct. 8, 1940 |
| 2,658,700 | Howell | Nov. 10, 1953 |
| 2,669,188 | McIntyre | Feb. 16, 1954 |

FOREIGN PATENTS

| | | |
|---|---|---|
| 291,007 | Great Britain | Aug. 2, 1928 |
| 373,998 | France | Apr. 5, 1907 |
| 807,978 | Germany | July 9, 1951 |